US010145982B2

(12) United States Patent
Yang et al.

(10) Patent No.: US 10,145,982 B2
(45) Date of Patent: Dec. 4, 2018

(54) POP-UP LONG-TERM MONITORING BASE STATION FOR SEAFLOOR HEAT FLOW

(71) Applicant: SOUTH CHINA SEA INSTITUTE OF OCEANOLOGY, CHINESE ACADEMY OF SCIENCES, Guangzhou, Guangdong (CN)

(72) Inventors: Xiaoqiu Yang, Guangzhou (CN); Zhaohua Sun, Guangzhou (CN); Xin Zeng, Guangzhou (CN); Xiaobin Shi, Guangzhou (CN)

(73) Assignee: SOUTH CHINA SEA INSTITUTE OF OCEANOLOGY, CHINESE ACADEMY OF SCIENCES, Guangzhou, Guangdong (CN)

( * ) Notice: Subject to any disclaimer, the term of this patent is extended or adjusted under 35 U.S.C. 154(b) by 133 days.

(21) Appl. No.: 15/318,493

(22) PCT Filed: Dec. 29, 2015

(86) PCT No.: PCT/CN2015/099544
§ 371 (c)(1),
(2) Date: Dec. 13, 2016

(87) PCT Pub. No.: WO2016/110207
PCT Pub. Date: Jul. 14, 2016

(65) Prior Publication Data
US 2017/0131432 A1   May 11, 2017

(30) Foreign Application Priority Data

Jan. 7, 2015 (CN) .......................... 2015 1 0009982

(51) Int. Cl.
*G01K 1/00* (2006.01)
*G01K 13/00* (2006.01)
(Continued)

(52) U.S. Cl.
CPC ..................... *G01V 9/005* (2013.01)

(58) Field of Classification Search
USPC .......................... 374/208, 163, 136, 137, 166
See application file for complete search history.

(56) References Cited

U.S. PATENT DOCUMENTS 3,656,345 A * 4/1972 Ingram .................. G01K 1/146
374/136

FOREIGN PATENT DOCUMENTS

| CN | 1424592 A | 6/2003 |
| CN | 2598863 Y | 1/2004 |

(Continued)

OTHER PUBLICATIONS

International Search Report dated Mar. 7, 2016, issued in counterpart application No. PCT/CN2015/099544. (4 pages).

*Primary Examiner* — Mirellys Jagan
(74) *Attorney, Agent, or Firm* — Westerman, Hattori, Daniels & Adrian, LLP

(57) ABSTRACT

A pop-up monitoring base station for seafloor heat flow includes a recovery unit, a discarding unit and a cable chopping mechanism. The recovery unit includes a recovery support, internally accommodating two acoustic release devices provided with closable hooks on bottoms thereof and loaded with floating balls. The discarding unit includes a discarding support, below which a heat flow probe is fixedly connected. The recovery unit and the discarding unit are fixed together through a steel wire rope with two ends connected with the closable hooks at the bottoms of the acoustic release devices. A cable extends from the discarding unit through the cable chopping mechanism fixed on the bottom of the recovery support and connects with the floating balls. The cable can be chopped off and/or pulled out (Continued)

automatically to realize successful separation between the recovery unit and the discarding unit.

8 Claims, 12 Drawing Sheets

(51) Int. Cl.
  *G01K 7/00*            (2006.01)
  *G01V 9/00*            (2006.01)

(56) References Cited

FOREIGN PATENT DOCUMENTS

| | | |
|---|---|---|
| CN | 1562699 A | 1/2005 |
| CN | 201497715 U | 6/2010 |
| CN | 102167136 A | 8/2011 |
| CN | 102221485 A | 10/2011 |
| CN | 102331275 A | 1/2012 |
| CN | 102913162 A | 2/2013 |
| CN | 103033845 A | 4/2013 |
| CN | 103759717 A | 4/2014 |
| CN | 104062691 A | 9/2014 |
| CN | 104525793 A | 4/2015 |
| CN | 104525794 A | 4/2015 |
| CN | 104570157 A | 4/2015 |
| CN | 104570158 A | 4/2015 |
| KR | 20060101933 A | 9/2006 |
| KR | 101281630 B1 | 7/2013 |

* cited by examiner

POP-UP LONG-TERM MONITORING BASE STATION FOR SEAFLOOR HEAT FLOW

TECHNICAL FIELD

The present invention relates to seafloor probing equipment, and in particular to a pop-up long-term monitoring base station for seafloor heat flow.

BACKGROUND ART

As a direct indication of an internal thermal process of the earth on the seafloor, terrestrial heat flow not only is a key parameter for understanding the heat diffusion rate of the earth, but also provides basic data for conducting geodynamic research, rebuilding the evolution of sedimentary basins, and evaluating the potential of oil, gas and hydrate resources. Therefore, it has national strategic significance to develop equipment for conducting seafloor heat flow measurements.

Seafloor heat flow can be measured by means of drilling temperature measurement and seafloor heat flow probes. Distribution areas for petroleum drilling and ocean drilling are limited, yet the seafloor heat flow probes are convenient for shipborne purposes with relatively flexible operation and lower cost and can carry out fine measurement in accordance with actual scientific issues and sea areas of interest, thereby being an important means for acquiring data on oceanic heat flows. In the 1950s, research scholars successfully carried out heat flow probing in sea areas of the North Atlantic Ocean by using a designed geothermal probe, which opened up an age of seafloor heat flow surveying. With the improvement of thermotechnical measurement theories and the advancement of technological methods thereof, as well as with the advancement and popularized application of computer technologies, large-scale integrated circuit technologies and storage technologies, the seafloor heat flow probe probing technology has also developed rapidly after almost half a century of development. The seafloor heat flow probes which are more mature and have been widely applied internationally today can be classified into two types, i.e., Ewing-type and Lister-type.

The above two types of probes in the prior art are available for acquiring seafloor geothermal parameters of sea areas where the bottom water temperature is stable over the long-term or smaller in fluctuations. But in some sea areas where the bottom water temperature tends to undergo larger periodical fluctuations, the temperature of surface sediments on the seafloor is also periodically influenced consequently so that geothermal gradients measured at the same site at different times change significantly, and the heat state of this site cannot be reflected truthfully, therefore, it is very difficult to acquire reliable data on seafloor heat flow in sea areas where the bottom water temperature has a larger fluctuation by using conventional seafloor heat flow probes (Ewing-type and Lister-type probes). Therefore, it is necessary to design a long-term monitoring base station with a reasonable structure for seafloor heat flow, to acquire more accurate and more reliable seafloor heat flow data in the sea areas where the bottom water temperature has a larger fluctuation, so as to meet the national strategic needs on carrying out basic research and resource surveys.

SUMMARY OF THE INVENTION

To solve the problem as described above, a pop-up long-term monitoring base station, for seafloor heat flow, with a reasonable structure, stable operation and availability for realizing pop-up recovery of a recovery unit is provided to desirably achieve the purpose of long-term probing for seafloor heat flow.

The object of the present invention as described above is achieved with a technical solution as follows:

A pop-up long-term monitoring base station for seafloor heat flow comprises a recovery unit 1, a discarding unit 2 and a cable chopping mechanism 3, wherein the recovery unit 1 is provided with a recovery support, which internally accommodates two acoustic release devices 13 of small tonnage, provided with closable hooks 131 on the bottoms thereof, and which is also loaded with floating balls 14; the discarding unit 2 is provided with a discarding support, below which a heat flow probe 24 is fixedly connected; the recovery unit 1 and the discarding unit 2 are fixed together through a steel wire rope 4 with two ends connected with the closable hooks 131 at the bottoms of the acoustic release devices 13; the cable chopping mechanism 3 is fixed on the bottom of the recovery support of the recovery unit 1 and is connected with the steel wire rope 4 through a movable hook, and a cable 0 enters the cable chopping mechanism 3 by starting from the discarding unit 2 and then penetrates out of the cable chopping mechanism 3 to be connected with the floating balls 14 of the recovery unit 1; and the cable chopping mechanism 3 is activated to chop the cable 0 by a change of the steel wire rope 4 from tensioning to relaxing.

In a preferred embodiment of a pop-up long-term monitoring base station for seafloor heat flow of the present invention, the recovery support comprises a center frame 11 in a longitudinal direction and a horizontal frame 12 disposed around the center frame 11 in two layers in a horizontal direction; the center frame 11 consists of a square prismoid framework 111 in a longitudinal direction and a vertical standing plate 112 extending upwards to the outside from ½ height inside the square prismoid framework; the vertical standing plate 112 and the square prismoid framework 111 are fixedly connected with each other; the square prismoid framework 111 internally accommodates the two acoustic release devices 13, which are hung on two sides of the vertical standing plate 112 respectively, and are provided with the closable hooks 131 at the bottoms that are driven to be opened and closed by stepping motors inside the acoustic release devices 13; and at least six floating balls 14 are disposed around the center frame 11 and supported by the two-layer horizontal frame 12.

In a preferred embodiment of a pop-up long-term monitoring base station for seafloor heat flow of the present invention, the discarding support comprises a supporting framework 21 having a quadrate top surface, a connecting framework 22 located on the top surface of the supporting framework 21, a heat flow probe fixing device 23 located below the top surface of the supporting framework 21, and a heat flow probe 24 fixed below the supporting framework 21 through the heat flow probe fixing device 23 the connecting framework 22 and the supporting framework 21 are fixedly connected with each other, and the supporting framework 21 and the heat flow probe fixing device 23 are fixedly connected with each other; and the connecting framework 22 is internally provided with two steel wire rope tensioning components 25 in symmetrical parallel distribution.

In a preferred embodiment of a pop-up long-term monitoring base station for seafloor heat flow of the present invention, the top surface of the connecting framework 22 of the discarding unit 2 is in anastomotic contact with a bottom surface of the square prismoid framework 111 of the recovery unit 1; the steel wire rope 4 passes through the two steel wire rope tensioning components 25 inside the connecting framework 22, with two ends respectively going up to cross an outer edge of a contact structure formed by the connecting framework 22 and the square prismoid framework 111 to finally take the shape of a ring for hooked connection with the closable hooks 131 at the bottoms of the acoustic release devices 13.

In a preferred embodiment of a pop-up long-term monitoring base station for seafloor heat flow of the present invention, the top surface of the connecting framework 22 of the discarding unit 2 is provided with positioning holes 221 at the positions of four corners; the bottom surface of the square prismoid framework 111 of the recovery unit 1 is provided with positioning projections 1111 at the positions of four corners; and the positioning holes 221 and the positioning projections 1111 are in anastomotic contact.

Preferably, the cable chopping mechanism 3 further comprises either of the following two specific structures:

a structure A, in which the cable chopping mechanism 3 is located in the space formed after the connecting framework 22 of the discarding unit 2 and the square prismoid framework 111 of the recovery unit 1 come into contact, wherein comprises:

a cable pressing plate 32A, wherein a lower surface of the cable pressing plate 32A is provided with a first groove 321A fitted with a blade 312A and a second groove 322A for embedding of the cable, the first groove 321A and the second groove 322A are vertical to each other and form a cross structure, and the first groove 321A is deeper than the second groove 322A; and the second groove 322A penetrates through two ends of the cable pressing plate 32A in which the second groove 322A is located;

a blade box 31A, wherein the top of the blade box 31A extends into the first groove 321A to be fixedly connected with the cable pressing plate 32A, one of side faces of the blade box 31A in parallel with the first groove 321A in trend is provided with a through hole 311A extending in a longitudinal direction, the blade box 31A is internally provided with a blade 312A with a cutting edge facing upwards against the first groove 321A, one of side faces of the blade 312A is provided with a projecting return device 3121A, which projects towards the outside of the blade box 31A through the through hole 311A and can slide up and down in the through hole 311A, and at the bottom of the two sides fees of the blade 312A are provided with recessed clamping slots; the blade box 31A is internally provided with a bracket 314A with an upper opening and a compression spring 313A, one end of the compression spring 313A passes through the opening and is fixedly connected with the bracket 314A, and the other end of the same is fixedly connected with the blade 312A, and the compression spring 313A is sufficient to make the blade 312A reach the interior of the first groove 321A to cut the cable after complete release; and an ejection control unit is disposed below and around the bracket 314A;

the ejection control unit comprising a pair of rotating rods 315A, a pair of supporting plates 316A and a torsional spring 317A, wherein the pair of rotating rods forms an encirclement for the bracket and the compression spring 313A therein, each rotating rod 315A consists of a clamping block 3151A, of which the top can be embedded in the corresponding recessed clamping slot, and an inverted L-shaped labor-saving lever in fixed connection with the clamping block 3151A, and each inverted L-shaped labor-saving lever is fixed on an inner side face of the blade box 31A at a break point position through a fixing rod and wholly rotates by taking the fixing rod as an axis; and the pair of supporting plates 316A is respectively fixed on two torsional arms at tail ends of the torsional spring 317A and forms a rotating connection with the bottoms of the corresponding inverted L-shaped labor-saving levers at respective distal ends thereof; and a hook 33A, which is connected with the middle of the torsional spring 317A through the steel wire rope.

Or, a structure B, in which the cable chopping mechanism 3 is located in the space formed after the connecting framework 22 of the discarding unit 2 and the square prismoid framework 111 of the recovery unit 1 come into contact, and comprises:

a cable pressing plate 32B, wherein a lower surface of the cable pressing plate 32B is provided with a first groove 321B fitted with a blade 312B and a second groove 322B for embedding of the cable, the first groove 321B and the second groove 322B are vertical to each other and form a cross structure, and the first groove 321B is deeper than the second groove 322B;

a blade box 31B, wherein a length direction of the top of the blade box 31B is in parallel with the first groove 321B and is fixedly connected with the cable pressing plate 32B, one of side faces of the blade box 31B in parallel with the first groove 321B in trend is provided with a through hole 311B extending in a longitudinal direction, the blade box 31B is internally provided with a blade 312B with a cutting edge facing upwards against the first groove 321B, one of side faces of the blade 312B is provided with a projecting return device 3121B which projects towards the outside of the blade box 31B through the through hole 311B and can slide up and down in the through hole 311B, and the other side face of the blade 312B is provided with a blade clamping slot 3122B in the middle; and a lower edge of the blade 312B is fixedly connected with one end of the compression spring 313B, the other end of the compression spring 313B is fixed on an inner bottom face of the blade box 31B, and the compression spring 313B is sufficient to make the blade 312B reach the interior of the first groove 321B to cut the cable after complete release;

a cable chopping mechanism fixing block 35B, which is fixed at a lower portion of one face, provided with a through hole 311B, of the blade box 31B; and an ejection control box 34B, which communicated with the blade box 31B and is located at a side far away from the cable chopping mechanism fixing block 35B, wherein an upper portion of the ejection control box 34B is fixedly provided with a trigger sheet 341B and a blade clamping lock 342B; the trigger sheet 341B which is a bent plate wholly taking an L shape is fixed on an inner side face of the ejection control box 34B through a trigger sheet rotating shaft 3412B at a place near a break point and wholly rotates by taking the trigger sheet rotating shaft 3412B as an axis, with an abaxial end placed horizontally and a paraxial end facing downwards; the blade clamping lock 342B which is a bent plate taking a wholly reversed Z shape is fixed on an inner side face of the ejection control box 34B through a blade clamping lock rotating shaft 3422B at a certain break point and can rotate wholly by taking the blade clamping lock rotating shaft 3422B as an axis, with an abaxial end capable of being snapped with the trigger sheet 341B and a paraxial end capable of being embedded into the blade clamping slot 3122B of the blade 312B; and the abaxial ends of the trigger sheet 341B and the blade clamping lock 342B are respectively connected with a top plate of the ejection control box 34B through a trigger sheet fixing spring 3411B and a blade clamping lock fixing spring 3421B; and a hook 33B, which is disposed at a lower side of the ejection control box 34B, wherein an upper portion of the hook 33B passes through a bottom surface of the ejection control box 34B and is located inside the ejection control box 34B and sleeved with a hook retractable spring 331B; the upper end of the hook retractable spring 331B is fixedly connected with the top of the hook 33B, and a lower end of the same is fixedly connected with the bottom surface in the ejection control box 34B; and a top end of the hook 33B is provided with an impacting column 332B over against the abaxial end of the trigger sheet 341B.

In the structure of the pop-up long-term monitoring base station for seafloor heat flow of the present invention, preferably, the blade, the compression spring, the torsional spring and other components of the long-term monitoring base station for the heat flow are all made of titanium alloy materials.

In the structure of the pop-up long-term monitoring base station for seafloor heat flow of the present invention, preferably, the heat flow probe fixing device 23 is a cylinder having a length equal to a height of the supporting framework 21, with a lower end fixedly connected with the seafloor heat flow probe 24; and the fixing device is internally provided with a cable joint pressing pipe 26, with a starting end starting from the seafloor heat flow probe 24, a pipe body penetrating through the interior of the heat flow probe fixing device 23 along an axial direction and passing through a round hole in the top surface of the supporting framework 21 to enter the space formed after the connecting framework 22 and the square prismoid framework 111 of the recovery unit 1 come contact, and a terminal located beside the cable chopping mechanism 3.

In a further preferred solution of the present invention, the terminal of the cable joint pressing pipe 26 is provided with a big-end-up plug type bolt 27, and the cable enters the cable pressing pipe 26 through the plug type bolt 27 to be finally connected with the seafloor heat flow probe 24.

In a further preferred solution of the present invention, the seafloor heat flow probe 24 mainly comprises a probe lance 2401 and a probe cabin body 2402, wherein the probe lance 2401 is a cylinder of a hollow structure, with one end in threaded connection with the probe cabin body 2402 and the other end closed by a detachable conical probe head 2403; the probe cabin body 2402 is internally provided with a temperature measurement circuit board 2404 and externally provided with a cable joint outlet 2405 and a heat transfer oil filling port 2406; the seafloor heat flow probe is internally provided with at least four temperature sensors 2407 having one ends provided with temperature probe heads 2408 distributed at equal intervals (an interval of 30 cm between every two of the temperature probe heads 2408) along an axial direction in an inner space of the probe lance 2401, and the other ends going deep into the probe cabin body 2402 to be fixed and connected with the temperature measurement circuit board 2404 through a conductor wire; in the probe lance 2401, two heat convection shielding sheets 2409 vertical to a lance shaft are disposed between every two of the temperature probe heads 2408 (at an interval of 10 cm between every two of the heat convection shielding sheets 2409), and are disc-type brushes formed by polypropylene fibers in a radial shape; a cable introduced from the temperature measurement circuit board 2404 is connected with an external master control system via the cable joint outlet 2405; and the heat transfer oil filling port 2406 is communicated to the interior of the probe lance 2401 through an oil filling guide pipe 2410. The seafloor heat flow probe is further internally provided with a fixing rod 2411, which is a slim rod with one end sleeved with a hollow bolt and with a non-threaded portion that is located inside the probe lance 2401, penetrates through the whole probe lance 2401 and is in threaded connection with the probe head 2403, and a bolt head portion at the other end is provided with more than three through holes 2412 around a position at which the slim rod and the bolt head portion are connected; the hollow bolt is in threaded connection with a connection structure formed by the probe lance and the probe cabin body; and both the heat convection shielding sheets and the temperature probe heads of the temperature sensors are fixed on the slim rod of the fixing rod, with the other ends of the temperature sensors penetrating through the through holes to enter the interior of the probe cabin body. All the threaded connections, the cable joint outlet, the heat transfer oil filling port, and all interfaces between the interior of the probe lance and the interior of the probe cabin body as shown are all subjected to watertight processing, for example, the watertight processing can be carried out by using a rubber seal ring, strong glue and the like.

In the structure of the pop-up long-term monitoring base station for seafloor heat flow of the present invention, various sensors including a bottom water temperature sensor, a deep sea pressure sensor and/or an attitude sensor can be installed on the recovery support of the recovery unit 1; the floating balls 14 of the recovery unit 1 are sealed glass balls, with one as a data collection cabin in which a data collection system is placed and another for holding a battery cabin; and eight watertight cable joints are reserved in a cabin body of the data collection cabin for external sensors to be connected into the data collection cabin. Four interfaces are reserved in the battery cabin for external use.

In the structure of the pop-up long-term monitoring base station for seafloor heat flow of the present invention, an electronic module, a software module, a power supply module and all the other functional modules of the acoustic release devices are completely independent of the pop-up long-term monitoring base station for seafloor heat flow, and only controlled by a shipborne data collection control system; and a recovery flag and a radio beacon can also be installed above the recovery support of the recovery unit. When the recovery unit floats on the sea surface, the beacon on the recovery support is revealed on the sea surface to start working and emit a signal, researchers can get the recovery unit by receiving the signal. Moreover, the recovery unit is provided with a red recovery flag as a mark, which is also convenient to find when floating on the sea surface.

Before the pop-up long-term monitoring base station for seafloor heat flow of the present invention is used, sensing equipment as required needs to be installed at a corresponding position, for example, the bottom water temperature sensor, the deep sea pressure sensor and/or the attitude sensor and the like are installed on the recovery support of the recovery unit; the seafloor heat flow probe is installed below the supporting framework of the discarding unit; and the data collection system of the recovery unit is well connected with all the sensors and the heat flow probe through the cables, where the cable 0 starting from the seafloor heat flow probe 24 penetrates the cable pressing plate of the cable chopping mechanism 3 after being fixed via the cable joint pressing pipe 26, is fixed and tensioned by the cable pressing plate, and then goes up to be well connected with the watertight cable joints of the floating balls 14 of the recovery unit 1.

After a long-term monitoring experiment for seafloor heat flow is completed, the monitoring base station receives an unhooking command emitted by the shipborne data collection control system, the steel wire rope for fixing the recovery unit and the discarding unit changes from a tensioning state to a relaxing state, the movable hook in hooked connection with the steel wire rope is relaxed, the cable chopping mechanism is activated to chop the cable, and the recovery unit and the discarding unit of the pop-up long-term monitoring base station for seafloor heat flow are disconnected therebetween; and finally, the recovery unit pops up by virtue of the buoyancy force and is spotted and recovered by researchers, and the discarding unit is left on the seafloor.

Under normal circumstances, the separation between the recovery unit 1 and the discarding unit 2 first activates the cable chopping mechanism 3 described above; if the chopping is successful, the recovery unit 1 pops up normally; if the chopping is not successful or partial chopping is implemented, a plug type bolt 27 disposed at a tail end of the cable joint pressing pipe 26 in a preferred solution of the present invention is used to centralize a stress applied to the cable in the cable joint pressing pipe 26 onto the plug type bolt 27; in the process in which the recovery unit 1 pops up, the recovery unit 1 and the discarding unit 2 are separated so that the cable joint pressing pipe 26 pops up following the recovery unit, the pressing force disappears, and at that moment, the cable can be pulled out by using the buoyancy force to guarantee the normal pop-up of the system.

The pop-up long-term monitoring base station for seafloor heat flow provided by the present invention can carry various sensing detection equipment and can carry out multi-parameter comprehensive monitoring on seafloor heat flow. More importantly, the monitoring base station of the present invention comprises a cable chopping and pull-out mechanism, which can automatically chop and/or pull out the cable under the condition of receiving a shipborne system signal to realize the smooth separation between the recovery unit and the discarding unit, and the recovery unit can automatically pop up to the sea surface to be recovered. Therefore, the pop-up long-term monitoring base station for seafloor heat flow of the present invention is suitable for long-term monitoring of seafloor heat flow. In addition, the pop-up long-term monitoring base station for seafloor heat flow of the present invention carries a seafloor heat flow probe with a brand new structure, the seafloor heat flow probe has a unique sensor distribution design and can measure the temperature of the sediments at different depths at the same time, and moreover, the heat convection shielding sheets are disposed inside the probe and can maximally avoid the heat convection between heat transfer oil at two sides to achieve very high measurement accuracy. Therefore, the heat flow probe carried by the pop-up long-term monitoring base station for seafloor heat flow of the present invention can improve the temperature accuracy during heat flow data determination more significantly.

Figure 1:
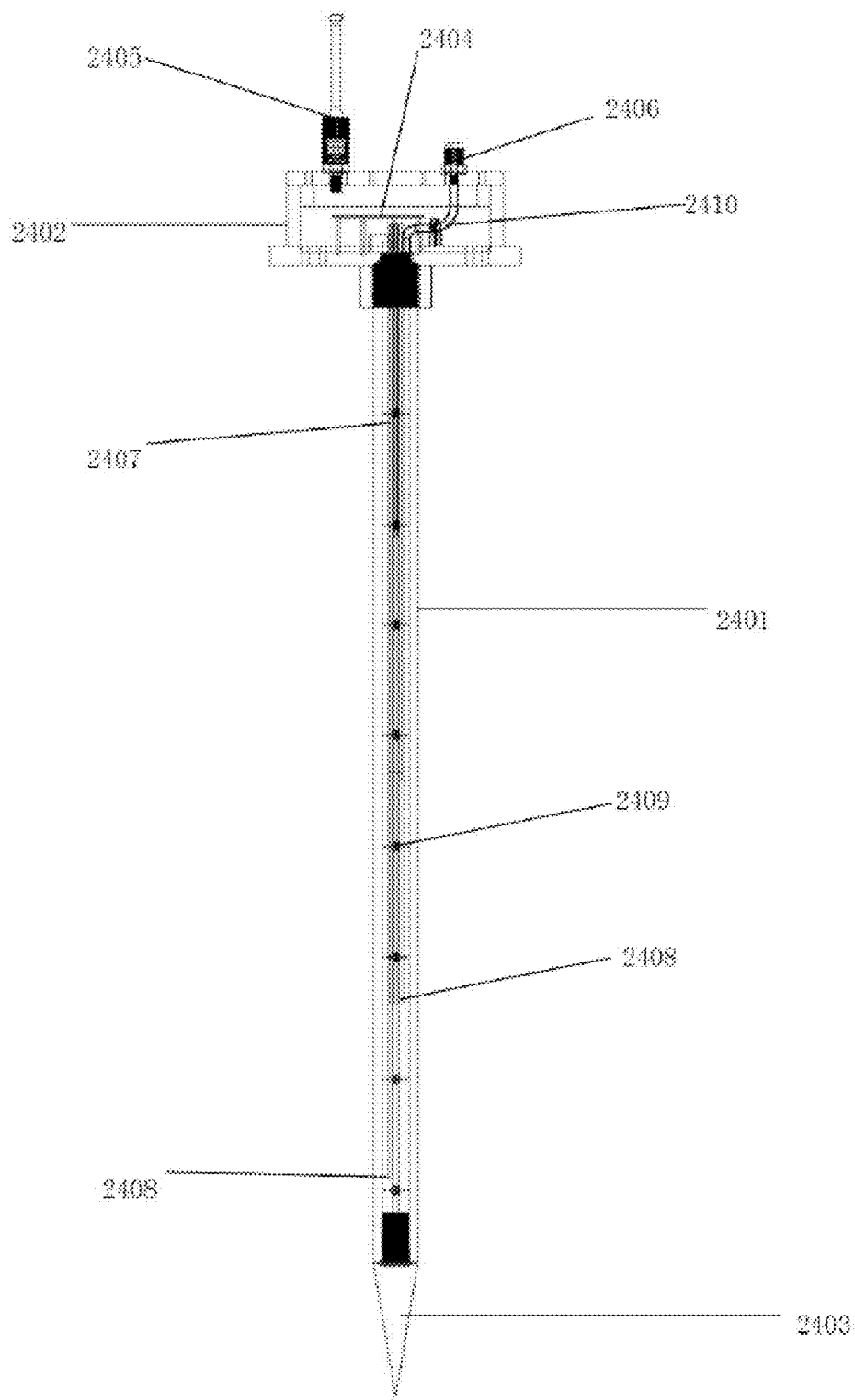
FIG. 1 is a schematic diagram of an overall structure of a seafloor heat flow probe in the present invention.

Reference signs in the drawings are as follows:

1. recovery unit; 11. center frame; 111. square prismoid framework; 1111. positioning projection; 112. vertical standing plate; 12. horizontal frame; 13. acoustic release device; 131. closable hook; 14. floating ball; 2. discarding unit; 21. supporting framework; 22. connecting framework; 221. positioning hole; 23. heat flow probe fixing device; 24. heat flow probe; 2401. probe lance; 2402. probe cabin body; 2403. probe head; 2404. temperature measurement circuit board; 2405. cable joint outlet; 2406. heat transfer oil filling port; 2407. temperature sensor; 2408. temperature probe head; 2409. heat convection shielding sheet; 2410. oil filling guide pipe; 2411. fixing rod; 25. steel wire rope tensioning component; 26. cable joint pressing pipe; 27. plug type bolt; 3. cable chopping mechanism; 31A. blade box; 311A. through hole; 312A blade; 3121A. return device; 313A. compression spring; 314A. bracket; 315A. rotating rod; 3151A. clamping block; 316A. supporting plate; 317A. torsional spring; 32A. cable pressing plate; 321A. groove; 322A. groove; 33A. hook; 31B. blade box; 311B. through hole; 312B. blade; 3121B. return device; 3122B. blade clamping slot; 313B. compression spring; 32B. cable pressing plate; 321B. groove; 322B. groove; 33B. hook; 331B. hook retractable spring; 332B. impacting column; 34B. ejection control box; 341B. trigger sheet; 3411B. trigger sheet fixing spring; 3412B. trigger sheet rotating shaft; 342B. blade clamping lock; 3421B. blade clamping lock fixing spring; 34228. blade clamping lock rotating shaft; 358. cable chopping mechanism fixing block; 4. steel wire rope; and 0. cable.

DESCRIPTION OF THE PREFERRED EMBODIMENTS

The present invention will be further described below with reference to specific embodiments. Therein, the attached drawings are merely intended for exemplary illustration, indicating schematic diagrams instead of physical diagrams, and cannot be construed as limiting the present invention to better illustrate the embodiments of the present invention, some components of the attached drawings will be omitted, enlarged or reduced, which does not represent the size of the actual product; and for those skilled in the art, it can be understood that some well-known structures and illustrations thereof in the attached drawings may be omitted.

The same or similar reference signs in the attached drawings of the embodiments of the present invention correspond to the same or similar components; in the description of the present invention, it should be understood that "upper", "lower", "left", "right", "vertical", "horizontal" and other terms indicating direction or position relations based on the direction or position relations as shown in the attached drawings are merely construed as describing the present invention and simplifying the description, instead of indicating or implying the necessary specific direction, the specific direction structure and operation of a device or element indicated, therefore, wordings describing the position relations in the attached drawings are merely intended for exemplary illustration and cannot be construed as limiting the present patent.

I. Structure of Seafloor Heat Flow Probe

Figure 2:
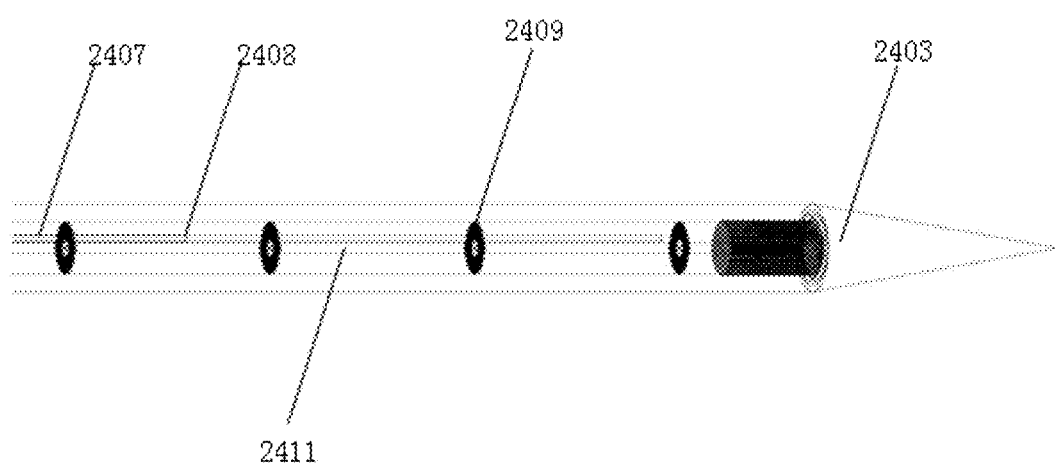
FIG. 2 is a schematic diagram of an internal structure of a probe lance in the present invention.
Figure 3:
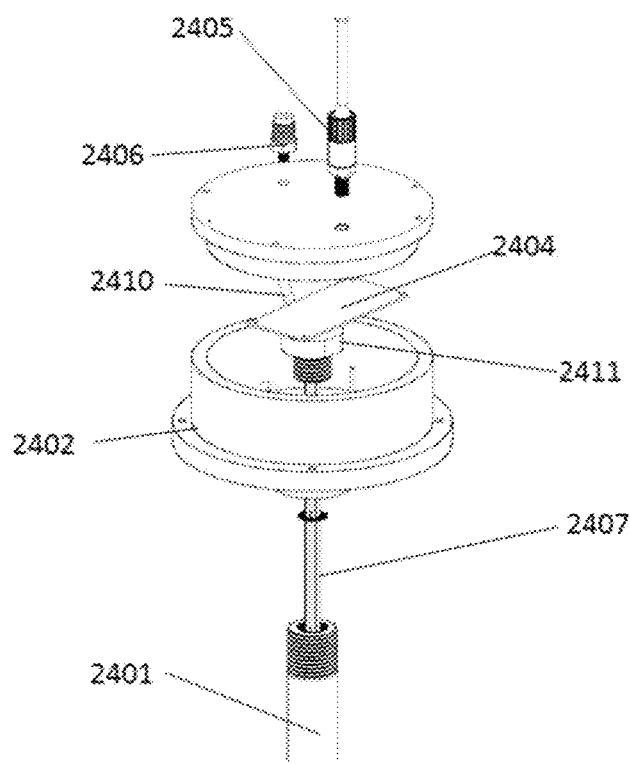
FIG. 3 is a schematic diagram of a structure of a probe fixing rod in the present invention.

As shown in FIG. 1, the seafloor heat flow probe 24 in the pop-up long-term monitoring base station for seafloor heat flow mainly comprises a probe lance 2401 and a probe cabin body 2402; the probe lance 2401 is a cylinder of a hollow structure, with one end in threaded connection with the probe cabin body 2402 and the other end closed by a detachable conical probe head 2403; as shown in FIG. 1 and FIG. 3, the probe cabin body 2402 is internally provided with a temperature measurement circuit board 2404 and externally provided with a cable joint outlet 2405 and a heat transfer oil filling port 2406; as shown in FIG. 2, the seafloor heat flow probe is internally provided with at least four temperature sensors 2407 having one end provided with temperature probe heads 2408 distributed at equal intervals (an interval of 30 cm between every two temperature probe heads 2408) along an axial direction in an inner space of the probe lance 2401, and the other ends going deep into the probe cabin body 2402 to be fixed and connected with the temperature measurement circuit board 2404 through a conductor wire (refer to FIGS. 1, 3 and 4); as shown in FIG. 2, in the probe lance 2401, two heat convection shielding sheets 2409 vertical to a lance shaft are disposed between every two of the temperature probe heads 2408 (at an interval of 10 cm between every two of the heat convection shielding sheets 2409), and are disc-type brushes formed by polypropylene fibers in a radial shape; a cable introduced from the temperature measurement circuit board 2404 is connected with an external master control system via the cable joint outlet 2405; and the heat transfer oil filling port 2406 is communicated to the interior of the probe lance 2401 through an oil filling guide pipe 2410.

Figure 4:
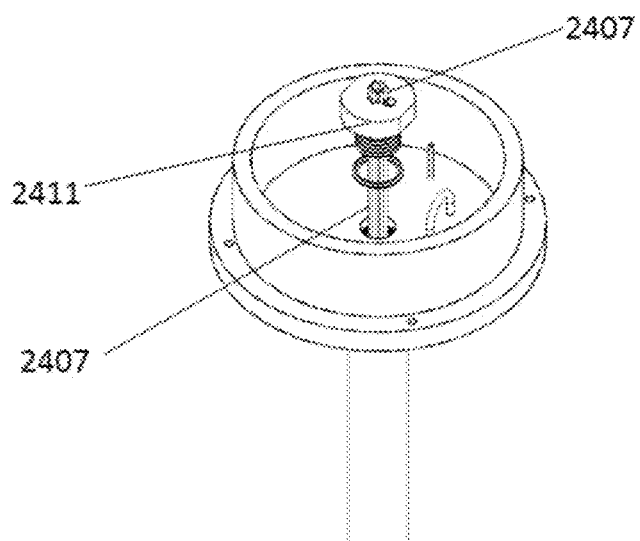
FIG. 4 is an assembly diagram of a fixing rod and a probe in the present invention.

As shown in FIGS. 2 to 4, the seafloor heat flow probe is further internally provided with a fixing rod 2411, which is a slim rod with one end sleeved with a hollow bolt and with a non-threaded portion that is located inside the probe lance 2401, penetrates through the whole probe lance 2401 and is in threaded connection with the probe head 2403 (refer to FIG. 2), and a bolt head portion at the other end is provided with more than three through holes (refer to FIGS. 3 and 4) around a position at which the slim rod and the bolt head portion are connected; the hollow bolt is in threaded connection with a connection structure formed by the probe lance and the probe cabin body (refer to FIGS. 3 and 4); and both the heat convection shielding sheets and the temperature probe heads of the temperature sensors are fixed on the slim rod of the fixing rod, with, the other ends of the temperature sensors penetrating through the through holes to enter the interior of the probe body (refer to FIGS. 3 and 4).

All the threaded connections, the cable joint outlet as shown, the heat transfer oil filling port, and all interfaces between the interior of the probe lance and the interior of the probe cabin body are all subjected to watertight processing, for example, the watertight processing can be carried out by using a rubber seal ring, strong glue and the like.

Figure 5:
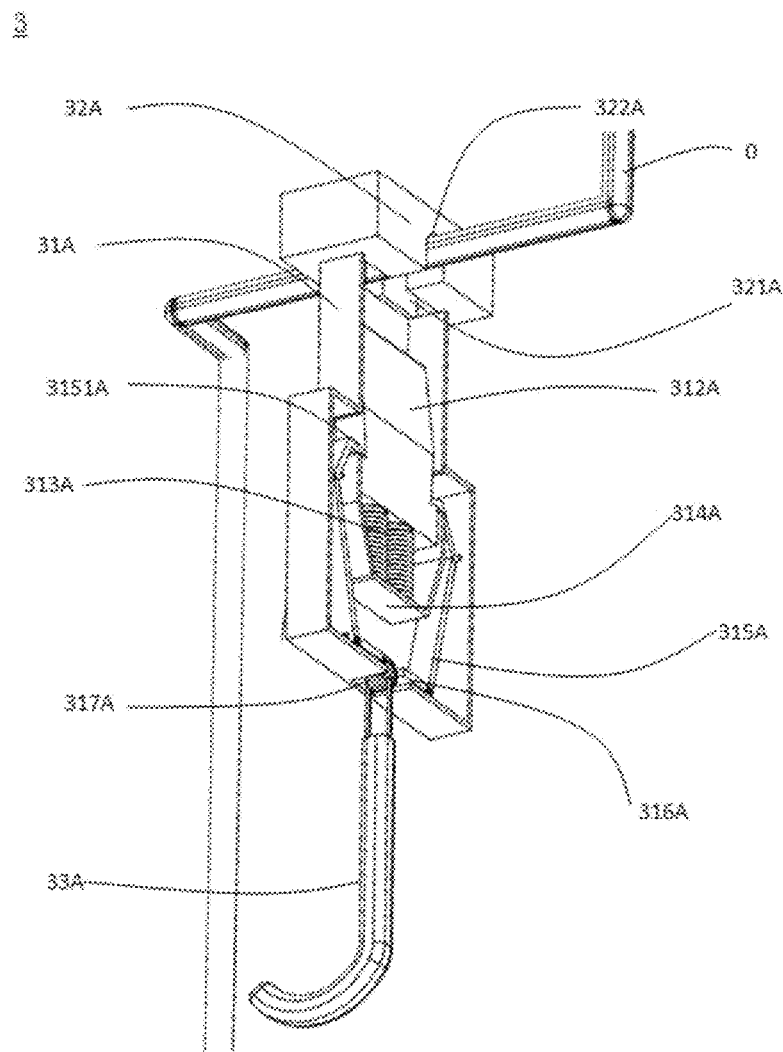
FIG. 5 is a schematic diagram of an overall structure of a cable chopping mechanism A in the present invention.
Figure 6:
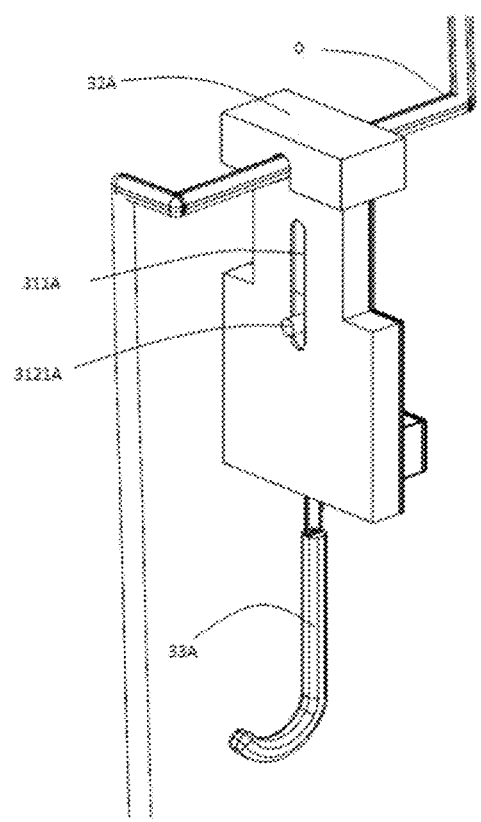
FIG. 6 is a schematic diagram of a structure of the other side face of the cable chopping mechanism A in the present invention.

II. Cable Chopping Mechanism A for the Pop-Up Long-Term Monitoring Base Station for Seafloor Heat Flow As shown in FIG. 5 and FIG. 6, the cable chopping mechanism mainly consists of a blade box 31A, a cable pressing plate 32A and a movable hook 33A; the cable pressing plate 32A is a horizontally placed cuboid with a thickness being more than two times the diameter of the cable, a lower surface of the cuboid is provided with cross grooves vertical to each other, the deeper groove 321A is 1.2 to 1.5 times deeper than the shallower groove 322A, and the shallower groove 322A has a width sufficient for embedding of the cable; the top of the blade box 31A extends into the deeper groove 321A to be fixedly connected with the cable pressing plate 32A and is provided with a through hole for keeping the penetration-through of the shallower groove 322A, and a through hole 311A extending in a longitudinal direction is disposed in an upper ⅔ section of an exposed portion of a side face of the blade box 31A, in parallel with the trend of the deeper groove 321A; the blade box 31A is internally provided with a blade 312A with a cutting edge facing upwards against the deeper groove 321A, and a certain side face of the blade 312A is provided with a projecting cylindrical or prismatic return device 3121A which passes through the through hole 311A to project towards the outside of the blade box 31A and can slide up and down in the through hole 311A, a lower edge of the blade 312A is fixedly connected with a strong compression spring 313A, which is completely compressed so that an upper edge of the blade 312A is located on an upper ⅙ portion in the blade box 31A and is completely released to sufficiently make the blade 312A reach the interior of the deeper groove 321A, and two sides faces of the blade 312A are provided with recessed clamping slots at lower portions; the strong compression spring 313A is fixed on a semi-open bracket 314A of a middle-lower portion in the blade box 31A, and an ejection control unit is disposed below and around the semi-open bracket 314A and is connected with the movable hook 33A at the downside; the ejection control unit comprises a pair of rotating rods 315A, a pair of supporting plates 316A and a set of strong torsional spring 317A; the pair of rotating rods 315A surrounds the semi-open bracket 314A and the strong compression spring 313A therein, each rotating rod 315A consists of a clamping block 3151A, of which a top end can be embedded in the clamping slot at the lower portion on the side face of the blade 312A, and an inverted L-shaped labor-saving lever, which is fixed on an inner side face of the blade box 31A at a break point position and wholly rotates by taking a fixed point as an axis; and the pair of supporting plates 316A is respectively fixed on two torsional arms at tail ends of the strong torsional spring 317A and forms a rotating connection with the bottom of the rotating rod 315A at respective distal ends; and the middle of the strong torsional spring 317A is connected with the movable hook 33A through the steel wire rope.

The blade, the strong compression spring, the strong torsional spring and other members are all made of titanium alloy materials.

Figure 7:
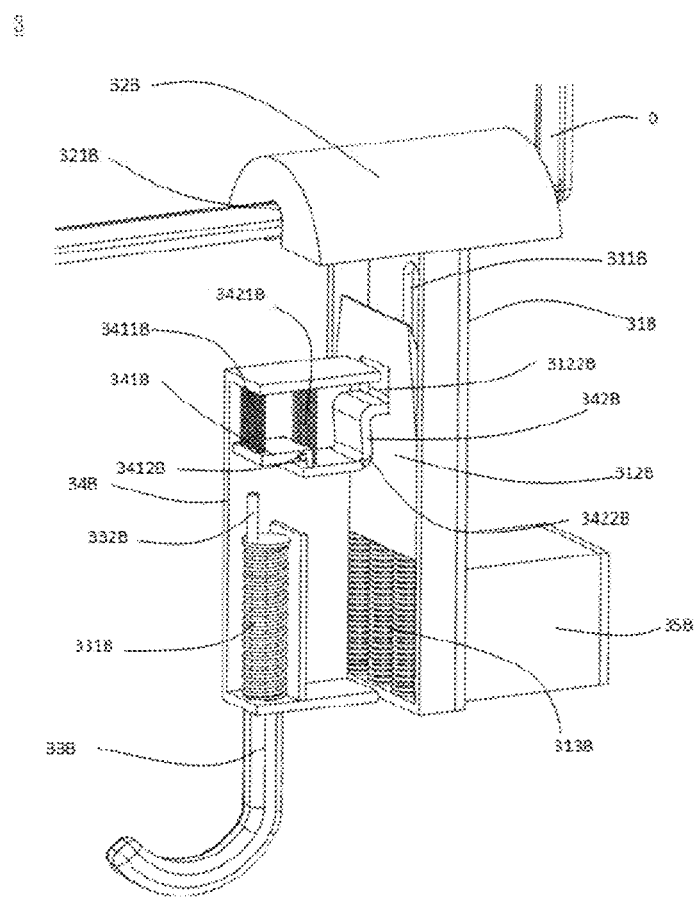
FIG. 7 is a schematic diagram of an overall structure of a cable chopping mechanism B in the present invention.
Figure 8:
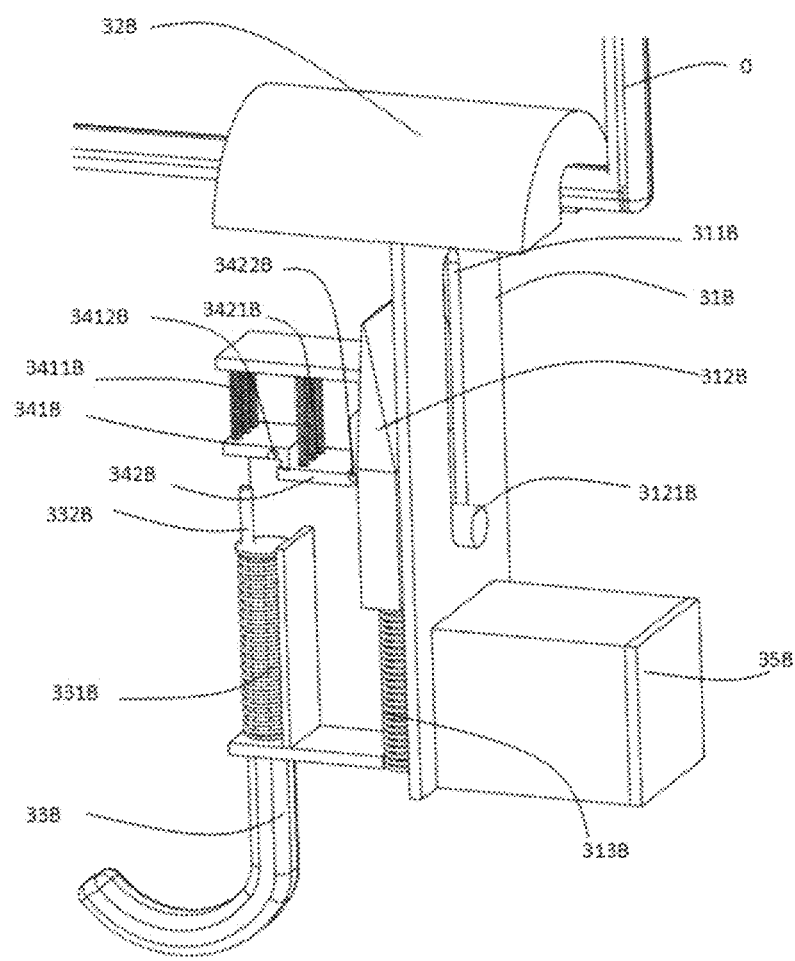
FIG. 8 is a schematic diagram of a structure of the other side face of the cable chopping mechanism B in the present invention.

III. Cable Chopping Mechanism for the Pop-Up Long-Term Monitoring Base Station for Seafloor Heat Flow As shown in FIG. 7 and FIG. 8, the cable chopping mechanism mainly consists of a blade box 31B, a cable pressing plate 32B, an ejection control box 34B and a movable hook 33B; the cable pressing plate 32B is a horizontally placed cuboid with a thickness being more than two times the diameter of the cable, a lower surface of the cuboid is provided with cross grooves vertical to each other, in which the deeper groove 321B is 1.2 to 1.5 times deeper than the shallower groove 322B in depth, and the shallower groove 322B has a width sufficient for embedding of the cable; the top of the blade box 31B is in parallel with the deeper groove 321B and is fixedly connected with the cable pressing plate 32B, and an upper ⅔ section of an exposed portion at one side face of the blade box 31B in parallel with the deeper groove 321B in trend is provided with a through hole 311B extending in a longitudinal direction; the blade box 31B is internally provided with a blade 312B with a cutting edge facing upwards against the deeper groove 321B, one face of the blade 312B is provided with a projecting cylindrical or prismatic return device 3121B which passes through the through hole 311B to project towards the outside of the blade box 31B and can slide up and down in the through hole 311B, and the other face of the blade 312B is provided with a recessed clamping slot 3122B in the middle; a lower edge of the blade 312B is fixedly connected with a strong compression spring 313B, which is completely compressed so that an upper edge of the blade 312B is located on an upper ⅙ portion in the blade box 31B and is completely released to sufficiently make the blade 312B reach an interior of the deeper groove 321B; a lower end of the strong compression spring 313B is fixed on a bottom surface in the blade box 31B; one face of the blade box 31B, provided with the through hole 311B, is externally connected with a cuboid cable chopping mechanism fixing block 35B at a lower portion, and the other face of the blade box 31B is communicated with an externally connected ejection control box 34B, in the ejection control box 34B, an upper portion is fixedly provided with a trigger sheet 341B and a blade clamping lock 342B; the trigger sheet 341B which is a bent plate wholly taking an L shape is fixed on an inner side face of the ejection control box 34B near a break point and can wholly rotate by taking a fixed point as an axis, with an abaxial end nearly horizontal and a paraxial end facing downwards; the blade clamping lock 342B which is a bent plate taking a wholly reversed Z shape is fixed on an inner side face of the ejection control box 34B at certain break point and can rotate wholly by taking the fixed point as an axis, with an abaxial end capable of being snapped with the paraxial end of the trigger sheet 3419 and a paraxial end capable of being embedded into the recessed clamping slot 3122B of the blade 312B; the abaxial ends of the trigger sheet 341B and the blade clamping lock 342B are respectively connected with a top plate of the ejection control box 34B through a trigger sheet fixing spring 3411B and a blade clamping lock fixing spring 3421B; and the movable hook 33B is below the ejection control box 34B, an upper portion of the movable hook 33B is located inside the ejection control box 34B and sleeved with a movable hook retractable spring 331B, which has an upper end fixedly connected with the top of the movable hook and a lower end fixedly connected with the bottom surface inside the ejection control box 34B, and a top end of the movable hook 33B is provided with an impacting column 332B over against the abaxial end of the trigger sheet 341B.

The blade, the strong compression spring, the trigger sheet, the blade clamping lock, the trigger sheet fixing spring, the blade clamping lock fixing spring, the movable hook, the movable hook retractable spring, the impacting column and other members are all made of titanium alloy materials.

IV. Pop-Up Long-Term Monitoring Base Station A for Seafloor Heat Flow

Figure 9:
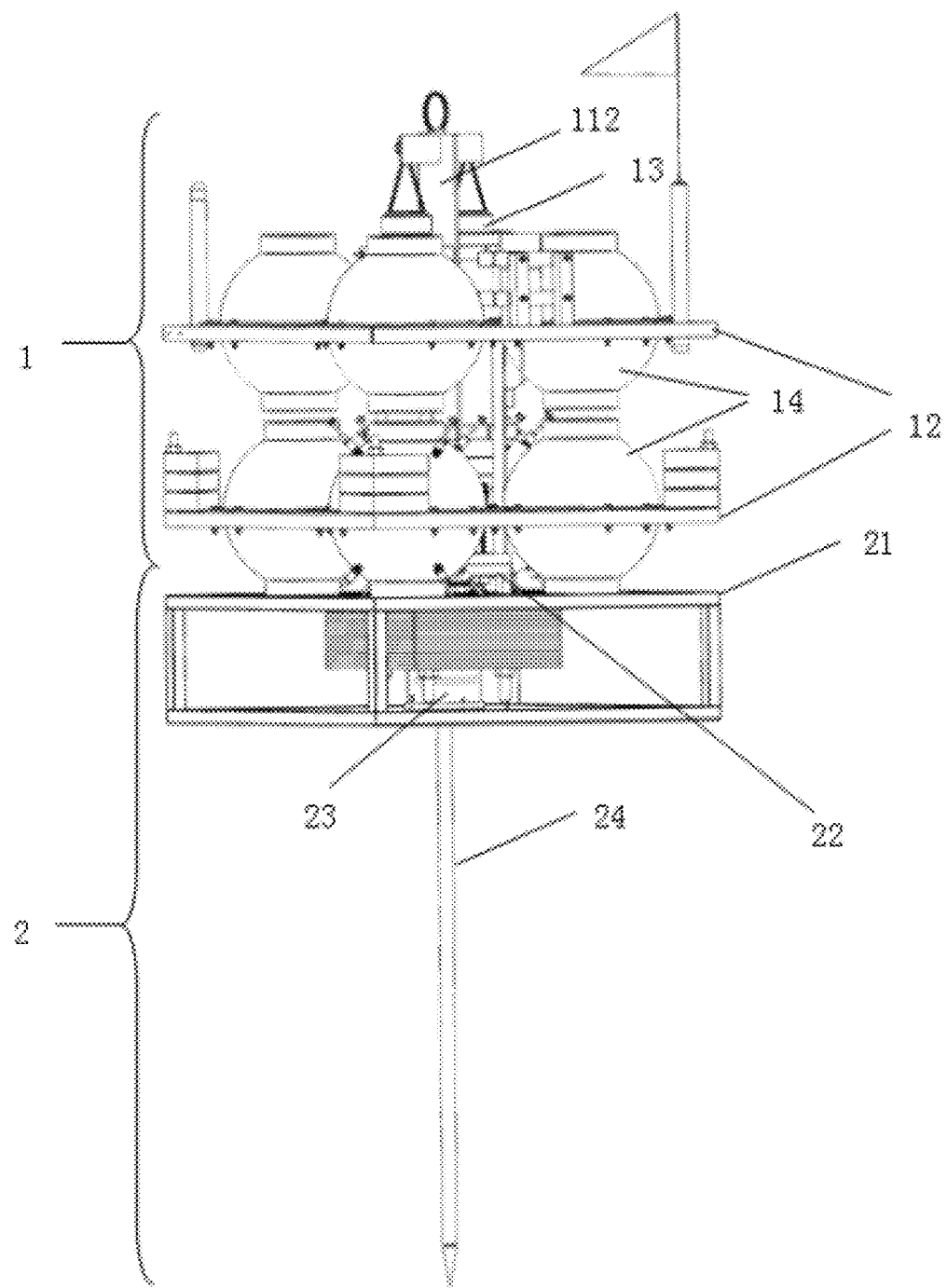
FIG. 9. is a schematic diagram of an overall structure of a pop-up long-term monitoring base station A for a seafloor heat flow in the present invention.
Figure 10:
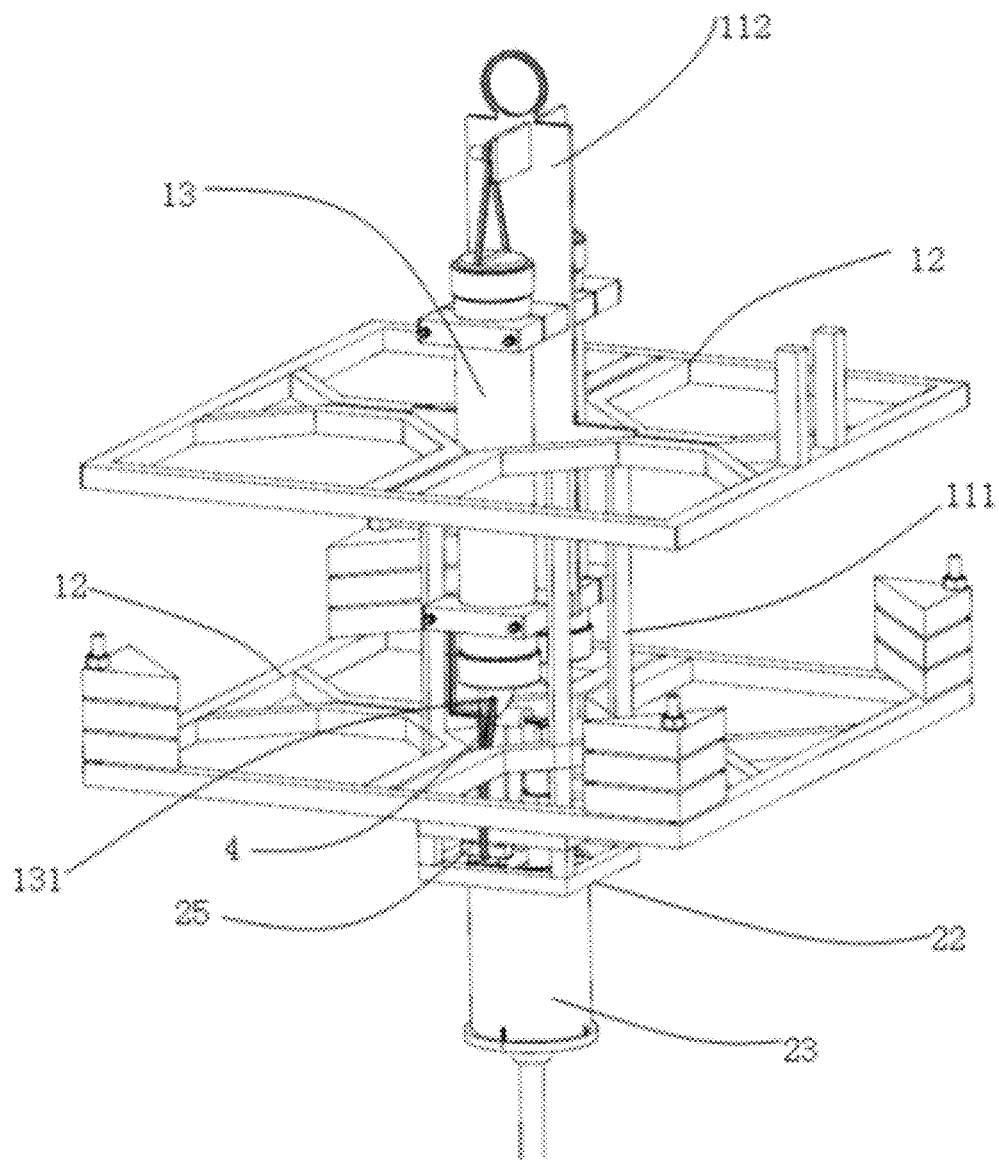
FIG. 10. is a schematic diagram of a framework structure of a recovery unit of the pop-up long-term monitoring base station A for seafloor heat flow in the present invention.
Figure 11:
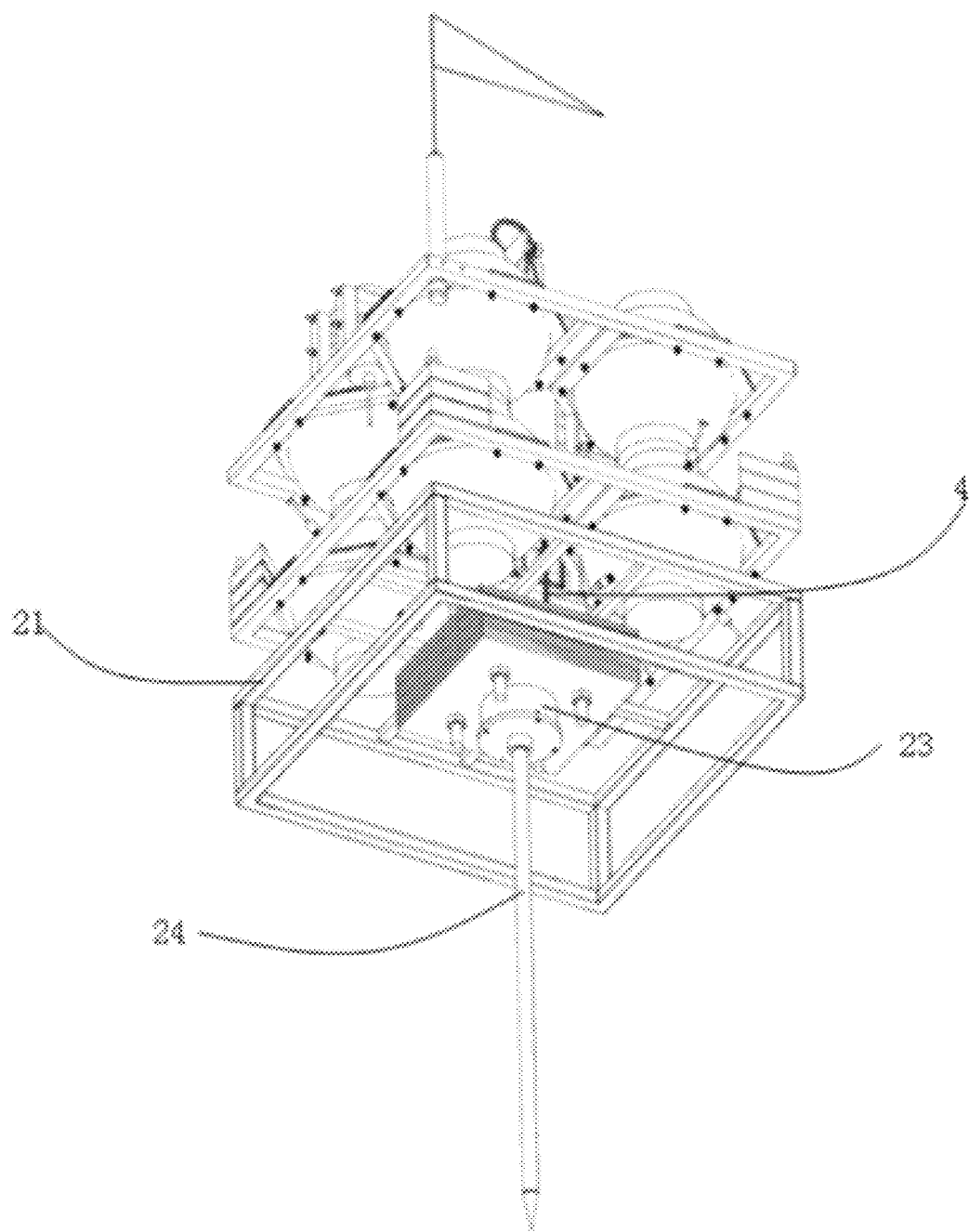
FIG. 11. is a schematic diagram of a structure of a discarding unit of the pop-up long-term monitoring base station for seafloor heat flow in the present invention.
Figure 12:
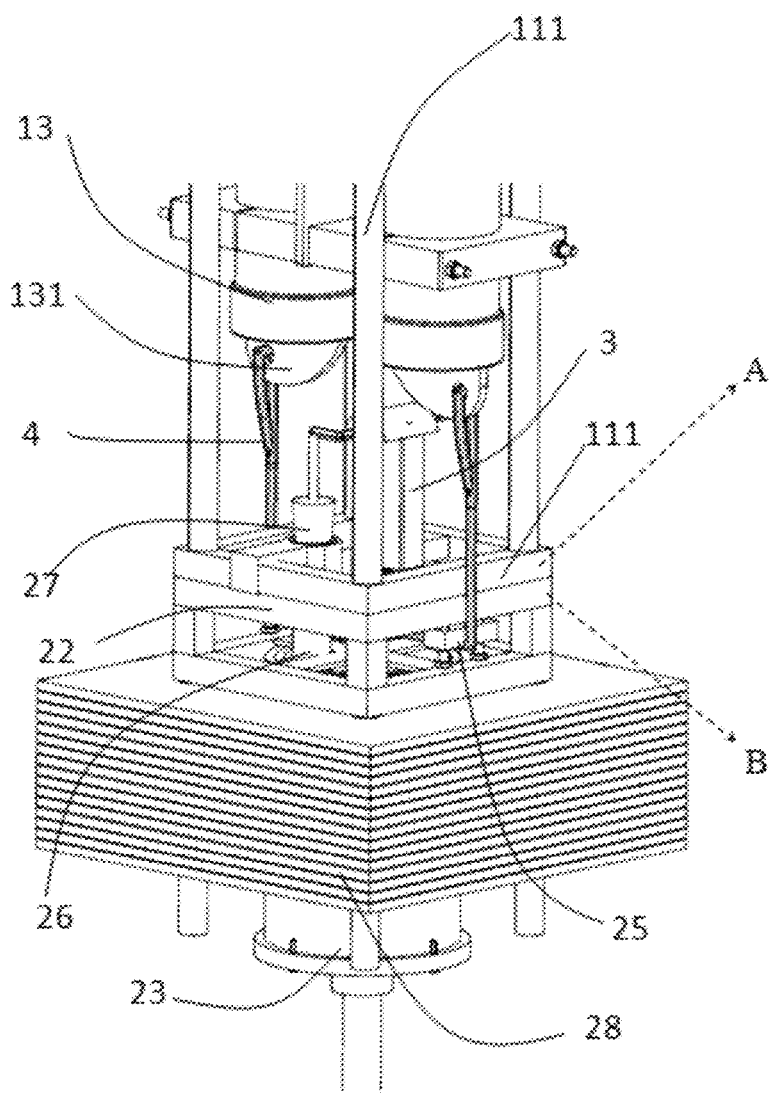
FIG. 12. is a schematic diagram of a position relation among the recovery unit, the discarding unit and the cable chopping mechanism of the pop-up long-term monitoring base station for seafloor heat flow in the present invention.
Figure 13:
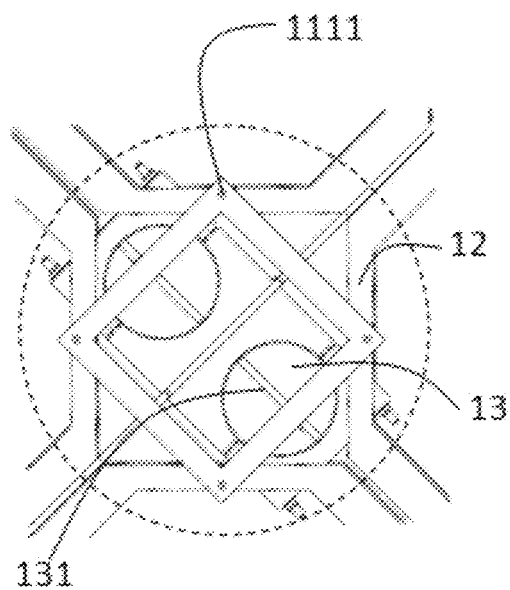
FIG. 13 is a bottom view of a portion A in FIG. 12.
Figure 14:
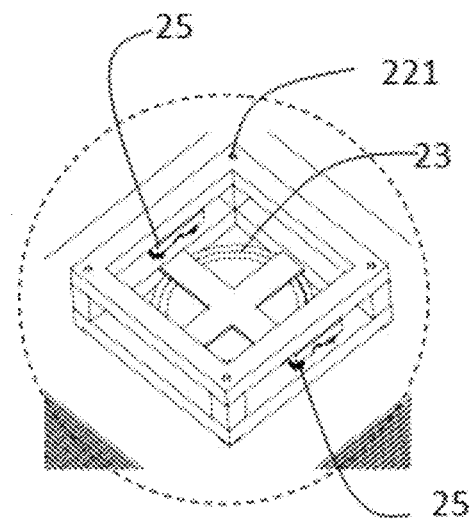
FIG. 14 is a top view of a portion B in FIG. 12.

As shown in FIG. 9, a pop-up long-term monitoring base station A for seafloor heat flow consists of a recovery unit 1, a discarding unit 2 and the cable chopping mechanism A as described in Embodiment 2 in general;

As shown in FIGS. 10 and 11, the recovery unit 1 is provided with a recovery support; the recovery support comprises a center frame 11 in a longitudinal direction and a horizontal frame 12 which is disposed around the center frame 11 in two layers in a horizontal direction; the center frame 11 consists of a square prismoid framework 111 in a longitudinal direction and a vertical standing plate 112 extending from ½ height of inside of the square prismoid framework; the vertical standing plate 112 and the square prismoid framework 111 are fixedly connected with each other; the square prismoid framework 111 internally accommodates two acoustic release devices 13, which are hung on two sides of the vertical standing plate 112 respectively and are provided with closable hook structures 131 that are driven to be closed by stepping motors inside the acoustic release devices 13, at the bottoms; and at least six floating balls 14 are disposed around the center frame 11 and supported by the two-layer horizontal frame 12;

As shown in FIGS. 9 to 14, the discarding unit 2 is provided with a discarding support; the discarding support comprises a supporting framework 21 having a quadrate top surface, a connecting framework 22 located on the top surface of the supporting framework 21, a heat flow probe fixing device 23 located below the top surface of the supporting framework 21, and a heat flow probe 24, as described in Embodiment 1, fixed below the supporting framework 2 through the heat flow probe fixing device 23; the connecting framework 22 and the supporting framework 21 are fixedly connected with each other, and the supporting framework 21 and the heat flow probe fixing device 23 are fixedly connected with each other; and the connecting framework 22 is internally provided with two steel wire rope tensioning components 25 in symmetrical parallel distribution; and As shown in FIGS. 12 to 14, the recovery unit 1 and the discarding unit 2 are fixed together through the steel wire rope 4; the top surface of the connecting framework 22 of the discarding unit 2 is provided with positioning holes 221 at the positions of four corners; the bottom surface of the square prismoid framework 111 of the recovery unit 1 is provided with positioning projections 1111 at the positions of four corners; and the positioning holes 221 and the positioning projections 1111 are in anastomotic contact. The steel wire rope 4 passes through the two steel wire rope tensioning components 25 inside the connecting framework 22, with two ends respectively going up to cross an outer edge of a contact structure formed by the connecting framework 22 and the square prismoid framework 111 to finally take the shape of a ring for hooked connection with the closable hooks 131 at the bottoms of the acoustic release devices 13; and as shown in FIGS. 12 to 14, the cable chopping mechanism A as described in Embodiment II is located in the space formed after the connecting framework 21 of the discarding unit 2 and the square prismoid framework 111 of the recovery unit 1 come into contact, and fixed at the bottom of the square prismoid framework 111 of the recovery unit 1.

As shown in FIGS. 9 to 14, in the discarding unit 2, the heat flow probe fixing device 23 is a cylinder having a length equal to a height of the supporting framework 21, with a lower end fixedly connected with the seafloor heat flow probe 24; and the heat flow probe fixing device 23 is internally provided with a cable joint pressing pipe 26, which starts from the seafloor heat flow probe 24 and has a pipe body penetrating through the interior of the heat flow probe fixing device 23 along an axial direction and passing through a round hole in a top surface of the supporting framework 21 to enter the space formed after the connecting framework 22 and the square prismoid framework 111 of the recovery unit 1 come into contact, and a terminal located beside the cable chopping mechanism 3. The terminal of the cable joint pressing pipe 26 is provided with a big-end-up plug type bolt 27.

The cable 0 is connected upwards with the floating balls 14 of the recovery unit 1, enters the shallower groove 322A of the cable pressing plate 32A when passing the cable chopping mechanism A, then enters the cable joint pressing pipe 26 through the plug type bolt 27, and finally is connected with the cable joint outlet 2405 of the seafloor heat flow probe 24 as described in Embodiment I.

In the structure of the pop-up long-term monitoring base station for seafloor heat flow of the present invention, various sensors including a bottom water temperature sensor, a deep sea pressure sensor and/or an attitude sensor can be installed on the recovery support of the recovery unit 1; floating balls 14 of the recovery unit 1 are sealed glass balls, with one as a data collection cabin in which a data collection system is placed and another for holding a battery cabin; and eight watertight cable joints are reserved in a cabin body of the data collection cabin for external sensors to be connected into the data collection cabin. Four interfaces are reserved in the battery cabin for external use.

In the structure of the pop-up long-term monitoring base station for seafloor heat flow of the present invention, an electronic module, a software module, a power supply module and all the other functional modules of the acoustic release devices are completely independent of the long-term monitoring base station for seafloor heat flow, and only controlled by a shipborne data collection control system; and a recovery flag and a radio beacon can also be installed above the recovery support of the recovery unit. When the recovery unit floats on the sea surface, the beacon on the recovery support is revealed on the sea surface to start working and emit a signal, researchers can get the recovery unit by receiving the signal. Moreover, the recovery unit is provided with a red recovery flag as a mark, which is also convenient to find when floating on the sea surface.

Before the pop-up long-term monitoring base station A for seafloor heat flow is used, sensing equipment as required is installed to a corresponding position, for example, the bottom water temperature sensor, the deep sea pressure sensor and/or the attitude sensor and the like are installed on the recovery support of the recovery unit; the seafloor heat flow probe is installed below the supporting framework of the discarding unit; and the data collection system of the recovery unit is well connected with all the sensors and the heat flow probe through the cables, therein, the cable 0 starting from the seafloor heat flow probe 24 penetrates into the shallower groove 322A of the cable pressing plate 32A of the cable chopping mechanism A after being fixed via the cable joint pressing pipe 26, is fixed and tensioned by the cable pressing plate 32A, and then goes up to be well connected with the watertight cable joints of the floating balls 14 of the recovery unit 1; the return device 3121A on the side face of the blade 312A is pulled downwards to compress the compression spring 313A in the blade box 31A, meanwhile, the tensioned steel wire rope is used to fix the recovery unit and the discarding unit of the long-term monitoring base station for seafloor heat flow, the movable hook 33A is hooked on the tensioned steel wire rope, a fine steel wire rope between the movable hook 33A and the torsional spring 317A is adjusted to keep the movable hook 33A in a tensioning state and keep the torsional spring 317A in a tensioning state, the pair of supporting plates 316A horizontally support the tail ends of the rotating rod 315A to allow the clamping block 3151A at the top end of the rotating rod 315A to be embedded into the clamping slot at the lower portion of the side face of the blade 312A to clamp the strong compression spring and the blade, both of which come into play; and the well installed pop-up long-term monitoring base station for seafloor heat flow is delivered to a specified sea area, lowered into the sea, and stably inserted into the seafloor sediments for data collection monitoring experiments.

After the long-term monitoring experiment for seafloor heat flow is completed, the monitoring base station receive an unhooking command emitted by the shipborne data collection control system, the steel wire rope for fixing the recovery unit and the discarding unit changes from a tensioning state to a relaxing state, and the movable hook 33A in hooked connection with the steel wire rope is relaxed; in the blade box 31A above the movable hook 33A, distal ends of the supporting plates 316A at two sides undergo a relative closing motion under the action of the strong torsional spring 317A to thereby drive the rotating rod 315A connected therewith to wholly rotate by taking the fixed point thereof as an axis, so that the pair of clamping blocks 3151A at the top end of the rotating rod 315A are separated from the position of the clamping slot at the lower portion on the side face of the blade 312A, at the moment, the strong compression spring 313A rebounds to drive the blade 312A above to eject towards the interior of the deeper groove 321A of the cable pressing plate 32A so as to chop the cable pressed tightly in the shallower groove 322A, and the recovery unit and the discarding unit of the pop-up long-term monitoring base station for seafloor heat flow are disconnected therebetween; and finally, the recovery unit pops up by virtue of the buoyancy force and is spotted and recovered by researchers, and the discarding unit is left on the seafloor.

Under normal circumstances, the separation between the recovery unit 1 and the discarding unit 2 first activates the cable chopping mechanism; if the chopping is successful, the recovery unit 1 pops up normally; if the chopping is not successful or partial chopping is implemented, a plug type bolt 27 disposed at a tail end of the cable joint pressing pipe 26 in a preferred solution of the present invention is used to centralize the stress applied to the cable in the cable joint pressing pipe 26 onto the plug type bolt 27; in the process in which the recovery unit 1 pops up, the recovery unit 1 and the discarding unit 2 are separated so that the cable joint pressing pipe 26 pops up following the recovery unit, the pressing force disappears, and at that moment, the cable can be pulled out by using the buoyancy force to guarantee the normal pop-up of the system.

V. Pop-Up Long-Term Monitoring Base Station B for Seafloor Heat Flow

A pop-up long-term monitoring base station B for seafloor heat flow approximately consists of a recovery unit 1, a discarding unit 2 and the cable chopping mechanism B as described in Embodiment III, compared with the pop-up long-term monitoring base station A for seafloor heat flow as described in the fourth part, it is distinctively featured only with a different cable chopping mechanism used, and the cable chopping mechanism B is fixed at the bottom of the square prismoid framework 111 of the recovery unit 1 through the cable chopping mechanism fixing block 35B; and the overall structure of the pop-up long-term monitoring base station B for seafloor heat flow can be referred to FIGS. 8 to 11.

In the pop-up long-term monitoring base station B for seafloor heat flow, the cable 0 is upwards connected with the floating balls 14 of the recovery unit 1, enters the shallower groove 322B of the cable pressing plate 32B when passing the cable chopping mechanism B, then enters the cable joint pressing pipe 26 through the plug type bolt 27, and finally is connected with the cable joint outlet 2405 of the seafloor eat flow probe 24 as described in Embodiment I.

In the structure of the pop-up long-term monitoring base station for seafloor heat flow of the present invention, various sensors including a bottom water temperature sensor, a deep sea pressure sensor and/or an attitude sensor can be installed on the recovery support of the recovery unit 1; the floating balls 14 of the recovery unit 1 are sealed glass balls, with one as a data collection cabin in which a data collection system is placed and another for holding a battery cabin; and eight watertight cable joints are reserved in a cabin body of the data collection cabin for external sensors to be connected into the data collection cabin. Four interfaces are reserved in the battery cabin for external use.

In the structure of the pop-up long-term monitoring base station for seafloor heat flow of the present invention, an electronic module, a software module, a power supply module and all the other functional modules of the acoustic release devices are completely independent of the pop-up long-term monitoring base station for seafloor heat flow, and only controlled by a shipborne data collection control system; and a recovery flag and a radio beacon can also been installed above the recovery support of the recovery unit. When the recovery unit floats on the sea surface, the beacon on the recovery support is revealed on the sea surface to start working and emit a signal, researchers can get the recovery unit by receiving the signal. Moreover, the recovery unit is provided with a red recovery flag as a mark, which is also convenient to find out when floating on the sea surface.

Before the pop-up long-term monitoring base station B for seafloor heat flow is used, sensing equipment as required is installed at a corresponding position, for example, the bottom water temperature sensor, the deep sea pressure sensor and/or the attitude sensor and the like are installed on the recovery support of the recovery unit; the seafloor heat flow probe is installed below the supporting framework of the discarding unit; and the data collection system of the recovery unit is well connected with all the sensors and the heat flow probe through the cables, therein, the cable 0 introduced from the seafloor heat flow probe 24 penetrates into the shallower groove 322B of the cable pressing plate 32B of the cable chopping mechanism B after being fixed via the cable joint pressing pipe 26, is fixed and tensioned by the cable pressing plate 32B, and then goes up to be well connected with the watertight cable joints of the floating balls 14 of the recovery unit 1; the return device 3121B on the side face of the blade 312B is pulled downwards to compress the compression spring 313B in the blade box 31B, meanwhile, the tensioned steel wire rope is used to fix the recovery unit and the discarding unit of the long-term monitoring base station for seafloor heat flow, the movable hook 33B is hooked on the tensioned steel wire rope to keep the movable hook 33B in a tensioning state, and the hook retractable spring 331B in the ejection control box 34B is compressed fully; meanwhile, the proximal end of the blade clamping lock 342B in the ejection control box 34B is embedded into the recessed clamping slot 3922B of the returned blade 392B to clamp the strong compression spring and the blade, both of which come into play, and the abaxial end of the blade clamping lock 342B is pressed below the proximal end of the trigger sheet 341B.

After the long-term monitoring experiment for seafloor heat flow is completed, the monitoring base station receives an unhooking command emitted by the shipborne data collection control system, the steel wire rope for fixing the recovery unit and the discarding unit changes from a tensioning state to a relaxing state, and the movable hook 33B in hooked connection with the steel wire rope is relaxed; the movable hook 33B rapidly bounces upwards under the action of an elastic force of the hook retractable spring 331B to impact the abaxial end of the trigger sheet 341 with the impacting column 332B at the top thereof, the trigger sheet rotates by taking the trigger sheet rotating shaft 3412B as an axis, and the proximal end of the trigger sheet 341B is made to rotate downwards by using a lever principle to drive the abaxial end of the blade clamping lock 342B to rotate downwards; likewise, the proximal end of the blade clamping lock 342B is made to rotate to be separated from the recessed clamping slot 3122B of the blade 312B by using the lever principle; at the moment, the strong compression spring 313B rebounds to drive the blade 312B above to eject towards the interior of the deeper groove 321B of the cable pressing plate 32B so as to chop the cable tightly pressed in the shallower groove 322B, and the recovery unit and the discarding unit of the pop-up long-term monitoring base station for seafloor heat flow are disconnected therebetween; and finally, the recovery unit pops up by virtue of the buoyancy force and is spotted and recovered by the researchers, and the discarding unit is left on the seafloor.

Under normal circumstances, the separation between the recovery unit 1 and the discarding unit 2 first activates the cable chopping mechanism 3; if the chopping is successful, the recovery unit 1 pops up normally; if the chopping is not successful or partial chopping is implemented, a plug type bolt 27 disposed at a tail end of the cable joint pressing pipe 26 in a preferred solution of the present invention is used to centralize the stress applied to the cable in the cable joint pressing pipe 26 onto the plug type bolt 27; and in the process in which the recovery unit 1 pops up, the recovery unit 1 and the discarding unit 2 are separated so that the cable joint pressing pipe 26 pops up following the recovery unit, the pressing force disappears, and at that moment, the cable can be pulled out by using the buoyancy force to guarantee the normal pop-up of the system.

The invention claimed is:

1. A pop-up monitoring base station for seafloor heat flow, comprising: a recovery unit; a discarding unit; and a cable chopping mechanism, wherein the recovery unit includes a recovery support, which internally accommodates two acoustic release devices provided with closable hooks on bottoms thereof and which is also loaded with floating balls, wherein the discarding unit includes a discarding support, below which a heat flow probe is fixedly connected, wherein the recovery unit and the discarding unit are fixed together through a steel wire rope with two ends connected with the closable hooks at the bottoms of the acoustic release devices, wherein the cable chopping mechanism is fixed on the bottom of the recovery support of the recovery unit and is connected with the steel wire through a movable hook, and a cable enters the cable chopping mechanism by starting from the discarding unit and then penetrates out of the cable chopping mechanism to be connected with the floating balls of the recovery unit, and wherein the cable chopping mechanism is activated to chop the cable by a change of the steel wire rope from tensioning to relaxing.

2. The pop-up monitoring base station for seafloor heat flow according to claim 1, wherein the seafloor heat flow probe comprises a probe lance and a probe cabin body, wherein the probe lance is of a hollow structure, with one end in threaded connection with the probe cabin body and the other end closed by a detachable conical probe head, wherein the probe cabin body includes a temperature measurement circuit and an externally located cable joint outlet and an externally located heat transfer oil filling port, wherein the seafloor heat flow probe includes at least four temperature sensors each having one end provided with a temperature probe head, the sensors being distributed at equal intervals along an axial direction of the probe lance in an inner space of the probe lance, and the other end of each of the sensors going deep into the probe cabin body end being fixed and connected with the temperature measurement circuit board through a conductor wire, wherein in the probe lance, at least one heat convection shielding sheet distributed along a radial direction of the probe lance is disposed between every two of the temperature sensors, and a signal outputted by the temperature measurement circuit board is connected with an external master control system via a cable joint outlet through the cable, wherein the heat transfer oil filling port is communicated to the interior of the probe lance through an oil filling guide pipe, wherein the seafloor heat flow probe further comprises a fixing rod, the fixing rod comprising a rod body and a hollow bolt, wherein the rod body is located inside the probe lance, wherein the hollow bolt is in threaded connection with a connection portion between the probe cabin body and the probe lance, wherein one end of the rod body is in threaded connection with the probe head, and the other end of the same is fixed inside the hollow bolt, wherein a head portion of the hollow bolt is provided with through holes, around the rod body, wherein the other ends of the temperature sensors pass through the corresponding through holes to extend into the probe cabin body, and wherein both the heat convection shielding sheets and the temperature probe heads are fixed on the rod body.

3. The pop-up monitoring base station for seafloor heat flow according to claim 1, wherein the recovery support further includes a center frame in a longitudinal direction and a horizontal frame disposed around the center frame in two layers in a horizontal direction, wherein the center frame includes a square prismoid framework in a longitudinal direction and a vertical standing plate extending upwards to the outside from ½ height inside the square prismoid framework, wherein the vertical standing plate and the square prismoid framework are fixedly connected with each other, wherein the square prismoid framework internally accommodates the two acoustic release devices, which are hung on two sides of the vertical standing plate respectively, and are provided with the closable hooks at the bottoms that are driven to be opened and closed by stepping motors inside the acoustic release devices, and wherein at least six floating balls are disposed around the center frame and supported by the two-layer horizontal frame.

4. The pop-up monitoring base station for seafloor heat flow according to claim 3, wherein the discarding support includes a supporting framework having a quadrate top surface, a connecting framework located on the top surface of the supporting framework, a heat flow probe fixing device located below the top surface of the supporting framework, and a heat flow probe fixed below the supporting framework through the heat flow probe fixing device, wherein the connecting framework and the supporting framework are fixedly connected with each other, wherein the supporting framework and the heat flow probe fixing device are fixedly connected with each other, and wherein the connecting framework is internally provided with two steel wire rope tensioning components in symmetrical parallel distribution.

5. The pop-up monitoring base station for seafloor heat flow according to claim 4, wherein the top surface of the connecting framework of the discarding unit is in anastomotic contact with a bottom surface of the square prismoid framework of the recovery unit, wherein the steel wire rope passes through the two steel wire rope tensioning components inside the connecting framework, with two ends respectively going up to cross an outer edge of a contact structure formed by the connecting framework and the square prismoid framework to finally take the shape of a ring for hooked connection with the closable hooks at the bottoms of the acoustic release devices, and wherein the cable chopping mechanism is located in a space formed after the connecting framework of the discarding unit and the square prismoid framework of the recovery unit come into contact.

6. The pop-up monitoring base station for seafloor heat flow according to claim 5, wherein the top surface of the connecting framework of the discarding unit includes positioning holes at positions of four corners, wherein the bottom surface of the square prismoid framework of the recovery unit is provided with positioning projections at positions of four corners, and wherein the positioning holes and the positioning projections are in anastomotic contact.

7. The pop-up monitoring base station for seafloor heat flow according to claim 5, wherein the cable chopping mechanism is located in the space formed after the connecting framework of the discarding unit and the square prismoid framework of the recovery unit come into contact, and is fixed at the bottom of the square prismoid framework of the recovery unit, wherein the cable chopping mechanism comprises:

a cable pressing plate, having a lower surface with a first groove fitted with a blade and a second groove for embedding of the cable, the first groove and the second groove being vertical to each other and forming a cross structure, and the first groove being deeper than the second groove;

a blade box, having a top that extends into the first groove to be fixedly connected with the cable pressing plate, one of side faces of the blade box being in parallel with the first groove and having a through hole extending in a longitudinal direction, the blade box internally including a blade with a cutting edge facing upwards against the first groove, one of side faces of the blade being provided with a projecting return device which projects towards the outside of the blade box through the through hole and capable of sliding up and down in the through hole, and two side faces of the blade having recessed clamping slots at lower portions, the blade box internally including a bracket with an upper opening and a compression spring, one end of the compression spring passing through the opening and being fixedly connected with the bracket, and the other end of the same being fixedly connected with the blade, with the compression spring making the blade reach the interior of the first groove to cut the cable after complete release; and an ejection control unit being disposed below and around the bracket, wherein the ejection control unit comprises: a pair of rotating rods; a pair of supporting plates; and a torsional spring, wherein the pair of rotating rods forms an encirclement for the bracket and the compression spring therein, each rotating rod including a clamping block, of which the top is configured to be embedded in the corresponding recessed clamping slot, and an inverted L-shaped labor-saving lever in fixed connection with the clamping block, and each inverted L-shaped labor-saving lever being fixed on an inner side face of the blade box at a break point position through a fixing rod and wholly rotating about the fixing rod as an axis, wherein the pair of supporting plates is respectively fixed on two torsional arms at tail ends of the torsional spring and forms a rotating connection with the bottoms of the corresponding inverted L-shaped labor-saving levers at respective distal ends, and wherein a hook is connected with the middle of the torsional spring through the steel wire rope.

8. The pop-up monitoring base station for seafloor heat flow according to claim 5, wherein the cable chopping mechanism is located in the space formed after the connecting framework of the discarding unit and the square prismoid framework the recovery unit come into contact, and is fixed at the bottom of the square prismoid framework of the recovery unit, and wherein the cable chopping mechanism comprises:

a cable pressing plate having a lower surface with a first groove fitted with a blade and a second groove for embedding of the cable, the first groove and the second groove being vertical to each other and forming a cross structure, and the first groove is deeper than the second groove;

a blade box having a top with a length direction being in parallel with the first groove and being fixedly connected with the cable pressing plate, one of side faces of the blade box being parallel with the first groove and having a through hole extending in a longitudinal direction, the blade box internally having a blade with a cutting edge facing upwards against the first groove, one of side faces of the blade being provided with a projecting return device which projects towards the outside of the blade box through the through hole and is configured to slide up and down in the through hole, and the other side face of the blade having a blade clamping slot in a middle, and a lower edge of the blade being fixedly connected with one end of the compression spring, the other end of the compression spring being fixed on an inner bottom face of the blade box, and the compression spring making the blade reach the interior of the first groove to cut the cable after complete release;

a cable chopping mechanism fixing block fixed at a lower portion of one face and having a through hole;

an ejection control box communicating with the blade box and located at a side far away from the cable chopping mechanism fixing block, and having an upper portion fixedly provided with a trigger sheet and a blade clamping lock, the trigger sheet being a bent plate with an L shape being fixed on an inner side face of the ejection control box through a trigger sheet rotating shaft at a place near a break point and wholly rotates by taking the trigger sheet rotating shaft as an axis, with an abaxial end placed horizontally and a paraxial end facing downwards; the blade clamping lock being a bent plate having a reversed Z shape fixed on an inner side face of the ejection control box through a blade clamping lock rotating shaft at certain break point and configured to rotate about the blade clamping lock rotating shaft as an axis, with an abaxial end capable of being snapped with the trigger sheet and a paraxial end capable of being embedded into the blade clamping slot of the blade; and the abaxial ends of the trigger sheet and the blade clamping lock being respectively connected with a top plate of the ejection control box through a trigger sheet fixing spring and a blade clamping lock fixing spring; and a hook, disposed at a lower side of the ejection control box, and having an upper portion passing through a bottom surface of the ejection control box and being located inside the ejection control box and sleeved with a hook retractable spring, an upper end of the hook retractable spring being fixedly connected with the top of the hook, and a lower end of the same being fixedly connected with a bottom surface in the ejection control box; and a top end of the hook having an impacting over against the abaxial end of the trigger sheet.

* * * * *